(12) United States Patent
Benisty et al.

(10) Patent No.: US 11,500,581 B2
(45) Date of Patent: Nov. 15, 2022

(54) EFFICIENT TLP FRAGMENTATIONS IN EXTENDED LBA ENVIRONMENT

(71) Applicant: Western Digital Technologies, Inc., San Jose, CA (US)

(72) Inventors: Shay Benisty, Beer Sheva (IL); Amir Segev, Meiter (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/183,203

(22) Filed: Feb. 23, 2021

(65) Prior Publication Data
US 2022/0100418 A1 Mar. 31, 2022

Related U.S. Application Data

(60) Provisional application No. 63/083,647, filed on Sep. 25, 2020.

(51) Int. Cl.
*G06F 3/06* (2006.01)
*G06F 12/02* (2006.01)

(52) U.S. Cl.
CPC ............ *G06F 3/0656* (2013.01); *G06F 3/067* (2013.01); *G06F 3/0619* (2013.01); *G06F 3/0631* (2013.01); *G06F 12/0238* (2013.01); *G06F 2212/1021* (2013.01)

(58) Field of Classification Search
CPC .... G06F 3/0656; G06F 3/0619; G06F 3/0631; G06F 3/067; G06F 12/0238; G06F 2212/1021
See application file for complete search history.

(56) References Cited

U.S. PATENT DOCUMENTS

| 6,542,941 B1 * | 4/2003 | Simpson, III .......... G06F 3/067 710/33 |
| 7,424,566 B2 | 9/2008 | Manula et al. |
| 10,069,597 B2 | 9/2018 | Benisty et al. |
| 10,095,645 B2 | 10/2018 | Davis et al. |
| 10,628,369 B2 | 4/2020 | Minato et al. |
| 10,740,000 B2 | 8/2020 | Benisty |

(Continued)

OTHER PUBLICATIONS

Kim, Seonbong et al.; "Optimized I/O Determininsm for Emerging NVM-based NVMe SSD in an Enterprise System", Proceedings of the 55th Annual Design Automation Conference, Jun. 24, 2018 (6 pages).

(Continued)

*Primary Examiner* — Masud K Khan
(74) *Attorney, Agent, or Firm* — Patterson & Sheridan, LLP; Steven H. VerSteeg

(57) ABSTRACT

The present disclosure generally relates to efficient transfer layer packet (TLP) fragmentation in a data storage device. For an unaligned read from host flow, an amount of data sufficient to be aligned is transferred to the memory device from the host while the remainder of the data is stored in cache of the data storage device to be delivered to memory device at a later time. For an unaligned write to host flow, the unaligned data is written to cache and at a later time the cache will be flushed to the host device. In both cases, while the total data would be unaligned, a portion of the data is placed in cache so that the data not placed in cache is aligned. The data in cache is delivered at a later point in time.

20 Claims, 5 Drawing Sheets

202a
1st 4K Buffer 202b
2nd 4K Buffer 202c
3rd 4K Buffer 202d
4th 4K Buffer

(56) References Cited

U.S. PATENT DOCUMENTS

| | | | |
|---|---|---|---|
| 10,789,019 | B2 | 9/2020 | Kim et al. |
| 2001/0011323 | A1 | 8/2001 | Ohta et al. |
| 2003/0188054 | A1 | 10/2003 | Yosimoto et al. |
| 2009/0037689 | A1 | 2/2009 | Kanuri |
| 2009/0228630 | A1 | 9/2009 | Wang et al. |
| 2014/0143471 | A1 | 5/2014 | Moyer et al. |
| 2015/0254022 | A1 | 9/2015 | Oikawa |
| 2016/0188473 | A1 | 6/2016 | Kruckemyer et al. |
| 2017/0116117 | A1 | 4/2017 | Rozen et al. |
| 2017/0285940 | A1 | 10/2017 | Benisty et al. |
| 2018/0039448 | A1 | 2/2018 | Harasawa et al. |
| 2018/0136869 | A1 | 5/2018 | Mola |
| 2019/0235759 | A1* | 8/2019 | Sen ................. G06F 3/0685 |
| 2019/0278485 | A1 | 9/2019 | Benisty |
| 2020/0112525 | A1 | 4/2020 | Donley et al. |
| 2020/0192804 | A1* | 6/2020 | Lee ................. G06F 12/0875 |
| 2020/0204495 | A1* | 6/2020 | Mallick ............ G06F 3/061 |

OTHER PUBLICATIONS

Related U.S. Appl. No. 16/512,312, filed Jul. 15, 2019.
Related U.S. Appl. No. 17/184,531, filed Feb. 24, 2021.
K Yogendhar, et al., Realizing the Performance Potential of a PCI-Express IP, ,Rambus Chip Technologies India (Pvt) Ltd., Design and Reuse, https://www.design-reuse.com/articles/15900/realizing-the-performance-potential-of-a-pci-express-ip.html, last visited Jan. 8, 2022, 9 pp.

* cited by examiner

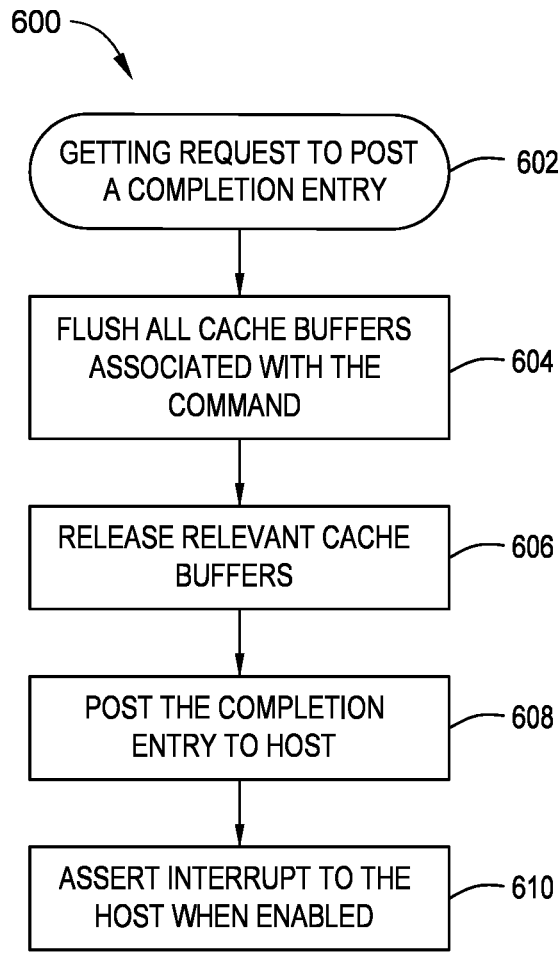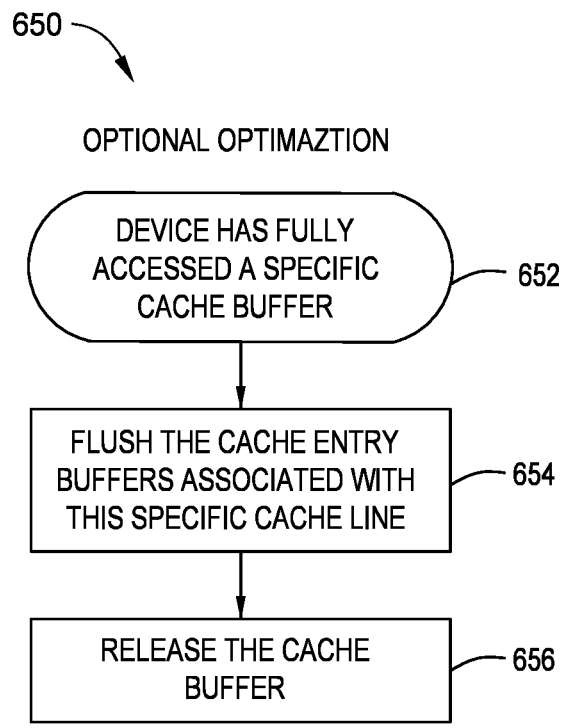
FIG. 6A
FIG. 6B

EFFICIENT TLP FRAGMENTATIONS IN EXTENDED LBA ENVIRONMENT

CROSS-REFERENCE TO RELATED APPLICATIONS

This application claims benefit of U.S. provisional patent application Ser. No. 63/083,647, filed Sep. 25, 2020, which is herein incorporated by reference.

BACKGROUND OF THE DISCLOSURE

Field of the Disclosure

Embodiments of the present disclosure generally relate to efficient transfer layer packet (TLP) fragmentation in a data storage device.

Description of the Related Art

Metadata is additional data allocated on a per logical block basis. There is no requirement for how a host device makes use of the metadata area. One of the most common usages for metadata is to convey end to end protection information.

Metadata may be transferred by the controller to or from the host device in one of two ways. The mechanism used is selected when the namespace is formatted. One mechanism for transferring the metadata is as a contiguous part of the logical block with which the metadata is associated. The metadata is transferred at the end of the associated logical block, forming an extended logical block as shown in FIG. 1.

The extended logical block address (LBA) format sets a major challenge in the data transfer when supporting out of order data transfers. FIG. 2 depicts the problem in a simple example. In the example, memory page size represents the size of each buffer in the host device DRAM and is set to 4 KB. The LBA size is also set to 4 KB while the metadata size is 16 bytes. The host device sends a read/write command and the total transfer size is three LBAs which means the following should be transferred on the PCIe bus: LBA A, Metadata A, LBA B, Metadata B, LBA C, and Metadata C. As shown in FIG. 2, four host device buffers are necessary for the command. The first buffer holds LBA A. The second buffer holds Metadata A plus the first part of LBA B. The third buffer holds the tail of LBA B, Metadata B, and the first part of LBA C. The last buffer holds the tail of LBA C and Metadata C.

In an out of order data transfer, the data storage device may need to transfer firstly LBA B and Metadata B. In such a situation, non-optimized packets will be issued over the PCIe bus for having the unaligned transfer. Later, the data storage device may need to transfer LBA A and Metadata A. Again, the data storage device will issue non-optimized packets for transferring the metadata only from the second buffer.

Thus, there is a need in the art for transfer layer packet (TLP) fragmentation optimization.

SUMMARY OF THE DISCLOSURE

The present disclosure generally relates to efficient transfer layer packet (TLP) fragmentation in a data storage device. For an unaligned read from host flow, an amount of data sufficient to be aligned is transferred to the memory device from the host while the remainder of the data is stored in cache of the data storage device to be delivered to memory device at a later time. For an unaligned write to host flow, the unaligned data is written to cache and at a later time the cache will be flushed to the host device. In both cases, while the total data would be unaligned, a portion of the data is placed in cache so that the data not placed in cache is aligned. The data in cache is delivered at a later point in time.

In one embodiment, a data storage device comprises: one or more memory devices; and a controller coupled to the one or more memory devices, wherein the controller is configured to: receive a read from host request; determine that the read from host request exceeds a maximum payload size (MPS); align an address and size of the request to the MPS to create an aligned request; allocate cache buffer storage space for the read from host request; send the aligned request to a host device; receive returned data that exceeds the MPS for the aligned request; and store the returned data in the allocated cache.

In another embodiment, a data storage device comprises: one or more memory devices; an interface module; and a controller coupled to the one or more memory devices, wherein the controller is configured to: receive a host request through the interface module; determine that the host request is unaligned; and retrieve data from cache.

In another embodiment, a data storage device comprises: one or more memory device; interface means for determining unaligned access requests from a host device; and a controller coupled to the one or more memory devices.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A and 6B are flowcharts illustrating methods cache flushing, according to multiple embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure.

Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to efficient transfer layer packet (TLP) fragmentation in a data storage device. For an unaligned read from host flow, an amount of data sufficient to be aligned is transferred to the memory device from the host while the remainder of the data is stored in cache of the data storage device to be delivered to memory device at a later time. For an unaligned write to host flow, the unaligned data is written to cache and at a later time the cache will be flushed to the host device. In both cases, while the total data would be unaligned, a portion of the data is placed in cache so that the data not placed in cache is aligned. The data in cache is delivered at a later point in time.

Figure 1:
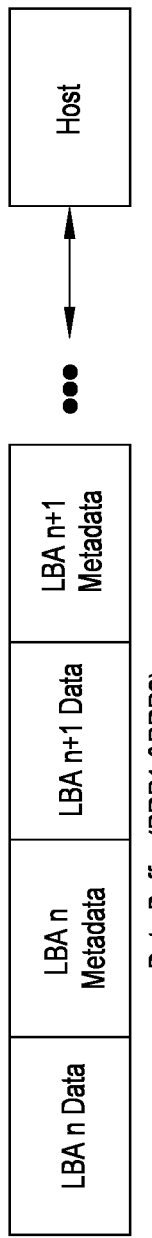
FIG. 1 is a schematic illustration of an extended logical block address (LBA).

FIG. 1 is a schematic illustration of an extended logical block address (LBA). Metadata is additional data allocated on a per logical block basis, where metadata may be information about the associated user data. For example, the metadata may convey end-to-end protection information for the associated user data. The metadata may be transferred by the controller of the data storage device to from the host device as part of a contiguous part of a logical block, in one example. The metadata may be transferred at the end of the associated logical block, where the logical block and the associated metadata forms an extended logical block.

The extended LBA includes a first data buffer that includes a first physical region page (PRP), PRP1, and a second PRP, PRP2. Each LBA of the extended LBA includes an associated metadata. For example, the first LBA n metadata is associated with the data of the first LBA n data and the second LBA n+1 metadata is associated with the data of the second LBA n+1 data. It is to be understood that the extended LBA may have any appropriate number of LBA data and LBA metadata pairs and the illustrated number is not intended to be limiting, but to provide an example of a possible embodiment.

Figure 2:
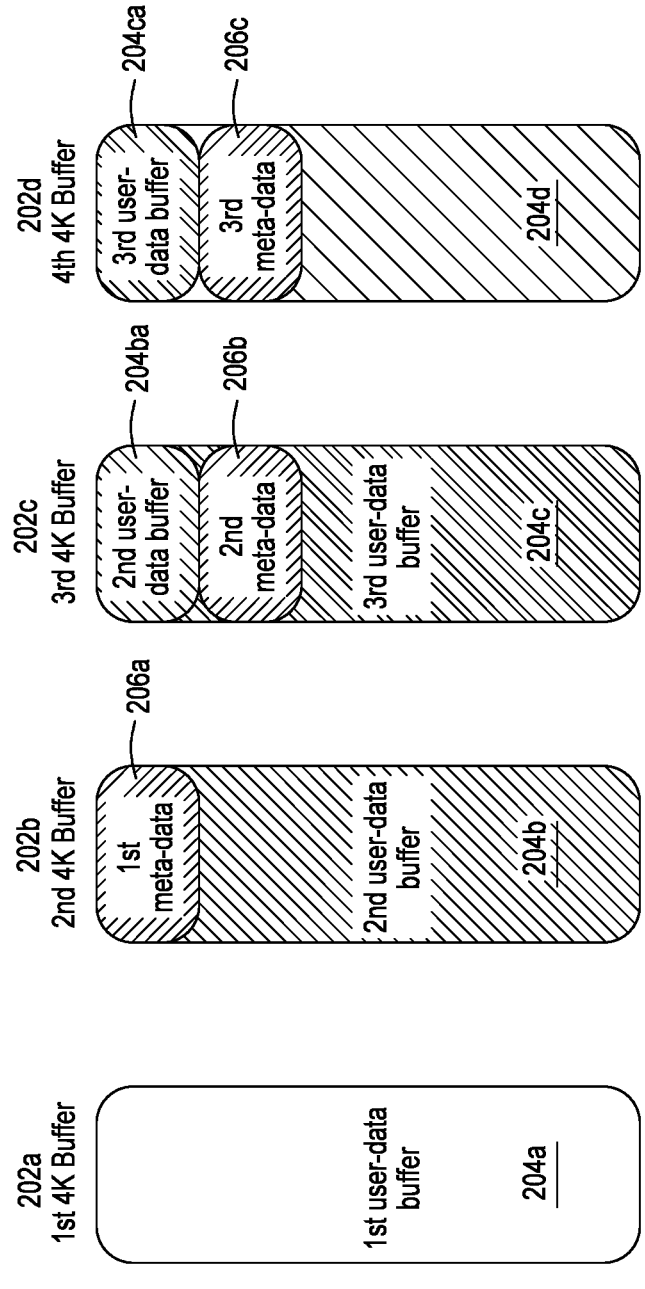
FIG. 2 is a schematic illustration of a data buffer example.

FIG. 2 is a schematic illustration of a data buffer example. Aspects of FIG. 1 may be similar to the data buffer example of FIG. 2. When transferring the extended LBA to the host, each LBA data size may be about 4 KB and each LBA metadata size may be about 16 bytes. Furthermore, the extended LBA may be stored in one or more buffers prior to transferring the extended LBA over a data bus to the host device. In one example, each of the one or more buffers has a size of about 4 KB. Each buffer in a PCIe architecture, for example, may have a maximum payload size (MPS), where the MPS represents the size of each buffer. It is to be understood that while the PCIe architecture is exemplified, other architectures are relevant and the embodiments herein are applicable to the other architectures.

When the host device sends a read/write command and the total transfer size is 3 LBAs, such that the 3 LBAs and the associated LBA metadata forms an extended LBA, four buffers 202a, 202b, 202c, 202d are required to transfer the 3 LBAs and the associated LBA metadata due to the buffer MPS. The 3 LBAs include a first user data 204a, a second user data 204b, 204ba, and a third user data 204c, 204ca. A first buffer 202a includes the first user data 204a. The term user data may refer to the LBA data, such as the first LBA n data of FIG. 1, interchangeably for exemplary purposes. A second buffer 202b includes a first metadata 206a associated with the first user data 204a and a first portion of the second user data 204b. Because the second buffer 202b has a size of about 4 KB and the relevant metadata is written sequentially to the one or more buffers, the second user data cannot fully be stored in the second buffer 202b.

Thus, a second portion of the second user data 204ba is stored in a third buffer 202c. The second metadata 206b is stored sequentially after the second portion of the second user data 204ba. Likewise, because the third buffer 202c has a size of about 4 KB, a first portion of the third user data 204c is stored in the third buffer 202c and a second portion of the third user data 204ca is stored in the fourth buffer 202d. The third metadata 206c is stored sequentially after the second portion of the third user data 204ca in the fourth buffer 202d.

When the data is transferred in order from first data to the last data, the transfer to/from the host device may be seamless. However, during an out-of-order data transfer, the data storage device may need to transfer the second user data 204b, 204ba and the second metadata 206b rather than the first user data 204a and the first metadata 206a. When transferring data out-of-order, non-optimized packets are issued over the PCIe bus that are associated with the unaligned transfer. Furthermore, when transferring the first user data 204a and the first metadata 206a, the data storage device issues non-optimized packets for transferring the first metadata 206a, without the first portion of the second user data 204b, from the second buffer 202b.

Figure 3:
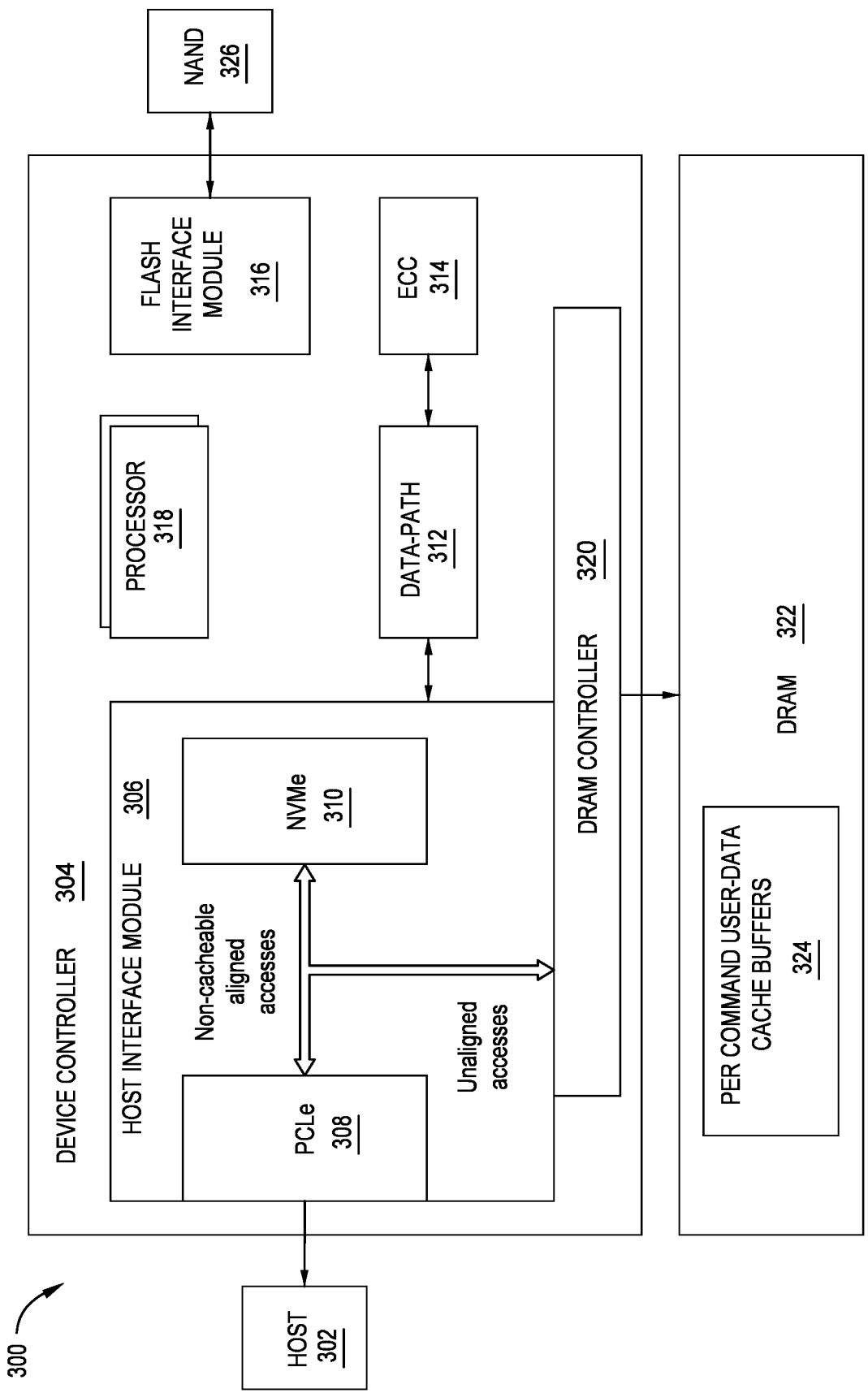
FIG. 3 is a schematic illustration of a storage system, according to one embodiment.

FIG. 3 is a schematic illustration of a storage system 300, according to one embodiment. The storage system 300 includes a host device 302 that interacts with a device controller 304 of a data storage device. For instance, the host device 302 may use the NAND 326 or in some embodiments a non-volatile memory included in the data storage device to store and retrieve data. In some examples, the storage system 300 may include a plurality of data storage devices, which may operate as a storage array. For instance, the storage system 300 may include a plurality of data storage devices configured as a redundant array of inexpensive/independent disks (RAID) that collectively function as a mass storage device for the host device 302.

The device controller 304 includes a host interface module (HIM) 306, a data-path 312, an error correction code (ECC) module 314, one or more processors 318, a flash interface module (FIM) 316, and a dynamic random access memory (RAM) controller 320. The dynamic RAM (DRAM) controller 320 interacts with the DRAM 322 that includes a per command user-data cache buffers 324. In the descriptions herein, the per command user-data cache buffers 324 may be referred to as cache buffers 324 for exemplary purposes.

In some embodiments, the DRAM controller 320 may be a static RAM (SRAM) controller that interacts with a SRAM. The FIM 316 may be configured to schedule the storage and retrieval of data from a location in the NAND 326. The one or more processors may be configured to generate and execute system commands to store, access, and perform operations on the data of the NAND 326. The ECC module 314 may generate ECC data for the user data stored in the NAND 326, where the ECC data may be a portion of the metadata associated with the user data.

When the host device 302 sends a read/write command to the device controller 304, the HIM 306 receives the read/write command. The HIM 306 includes a PCIe 308 and an NVMe 310. The PCIe 308 and the NVMe 310 may be configured to operate according to the respective protocols. For example, the size of each buffer, such as the buffers 202a, 202b, 202c, 202d of FIG. 2, are configured by the host device 203 at the initialization phase. In some embodiments, the size of the buffers are in a size of about 4 KB, 8 KB, 16 KB, 32 KB, etc. It is to be understood that the listed sizes are not intended to be limiting, but to provide an example of a possible embodiment. Data transfers may be considered as aligned when: the data transfer size satisfies the equation N*MPS, where N is an integer value and the address of the first buffer is aligned to the MPS (e.g., PCIe address % MPS=0). When the data transfer does not satisfy the equation N*MPS or the address of the first buffer is not aligned to the MPS, the data transfer may be considered as unaligned. When metadata is present, the two conditions are not met. While metadata is small in size (e.g., 16 bytes), the metadata leads to unalignment.

Aligned transfers bypass the cache (i.e., the buffers) and may interact directly with the host device 302 according to previous approaches. More specifically, data is sense by the NAND and the readiness of the data may not be in order. Considering the example above, LBA B may be ready first. In that case, LBA B along with metadata B should be transferred first. For this specific chunk, the data storage device determines the aligned and unaligned chunks, which is based on the PCIe MPS parameter. The chunks that are fully aligned to PCIe MPS will bypass the cache while the unaligned chunks interact with the cache. Stated another way, when the aligned transfer has a size equal to the MPS of the PCIe parameter configured by the host device 203 at the initialization phase, the data transfer bypasses the cache. However, unaligned transfers are classified as cacheable data. The unaligned transfers are transferred to the DRAM controller 320, where the DRAM controller stores the unaligned transfers to the cache buffers 324 of the DRAM 322. For each outstanding command, an allocated buffer storage space of the cache buffers 324 is allocated to the outstanding command.

To better understand how the data storage device handles aligned and unaligned transfers, the following example is provided for a system having the following parameters: memory page size of 4 KB, LBA of 4 LB, metadata size of 16 bytes, and PCIe MPS of 512 bytes. For the host command, the host provides a host write command (PCIe read flow). The command size is 3 LBAs. The first buffer has a size of 4 KB, the second buffer has a size of 4 KN, the third buffer has a size of 4 KB, and the fourth buffer has a size of 4 KB though only 48 bytes are valid. The total transfer size for the 3 LBAs would be 3×(LBA size+metadata size)=12 KB +48 bytes. When the data storage device decided to transfer the second LBA first, the second buffer would be the first needed buffer. Hence, the second buffer would have 4 KB-16 bytes of availability due to the 4 KB size of the second buffer minus the 16 bytes reserved for the metadata for the first LBA. Hence, to transfer the second LBA, the next buffer (i.e., third buffer) is needed as well to hold the tail of the second LBA (i.e., 16 bytes) as well as the second LBA metadata (i.e., 16 bytes). In other words, the next buffer (i.e., third buffer) needs 16 bytes for the second LBA.

Defining which buffers are aligned to the PCIe MPS can occur continuing the above example in which 9 buffers are present for a transfer. The first buffer has a size of 512-16 bytes (i.e., 496 bytes). The second through eighth buffers have a size of 512 bytes. The ninth buffer has a size of 32 bytes. Thus, the first and ninth buffers are unaligned while the second through eighth buffers are aligned. Hence, the first and ninth buffers interact with the cache while the first and ninth buffers will be held in the cache. The data storage device would, hence, align as follows—the first aligned buffer would be the second buffer with 512 bytes and the third buffer with 512 bytes would be the last aligned buffer. The required data is used by the controller while the extra data is stored in the two cache buffers and will be used when needed. The two cache buffers will be needed when transferring the first LBA and the third LBA because there will be cache hits in those scenarios.

During the PCIe read flow, the logical block address and the size of the request is aligned to the MPS. The aligned transfer with the size of the MPS is issued to the host device 302 by the device controller 304. The returned data (i.e., the extended LBA) is stored in an allocated cache buffer storage space of the cache buffers 324 of the DRAM 322 when the returned data exceeds the MPS for the aligned request. The requested data of the read command is returned to the host device 302 while the remaining data is stored in the allocated cache buffer storage space of the cache buffers 324. When receiving another read command for the remaining data, the remaining data is returned to the host device 302 from the allocated cache buffer storage space of the cache buffers 324 directly. However, during the PCIe write flow, the unaligned data is written to the cache buffers 324. When the remaining data associated with the unaligned data is written to the cache buffers 324, the cache buffers 324 are flushed to the host device 302.

Figure 4:
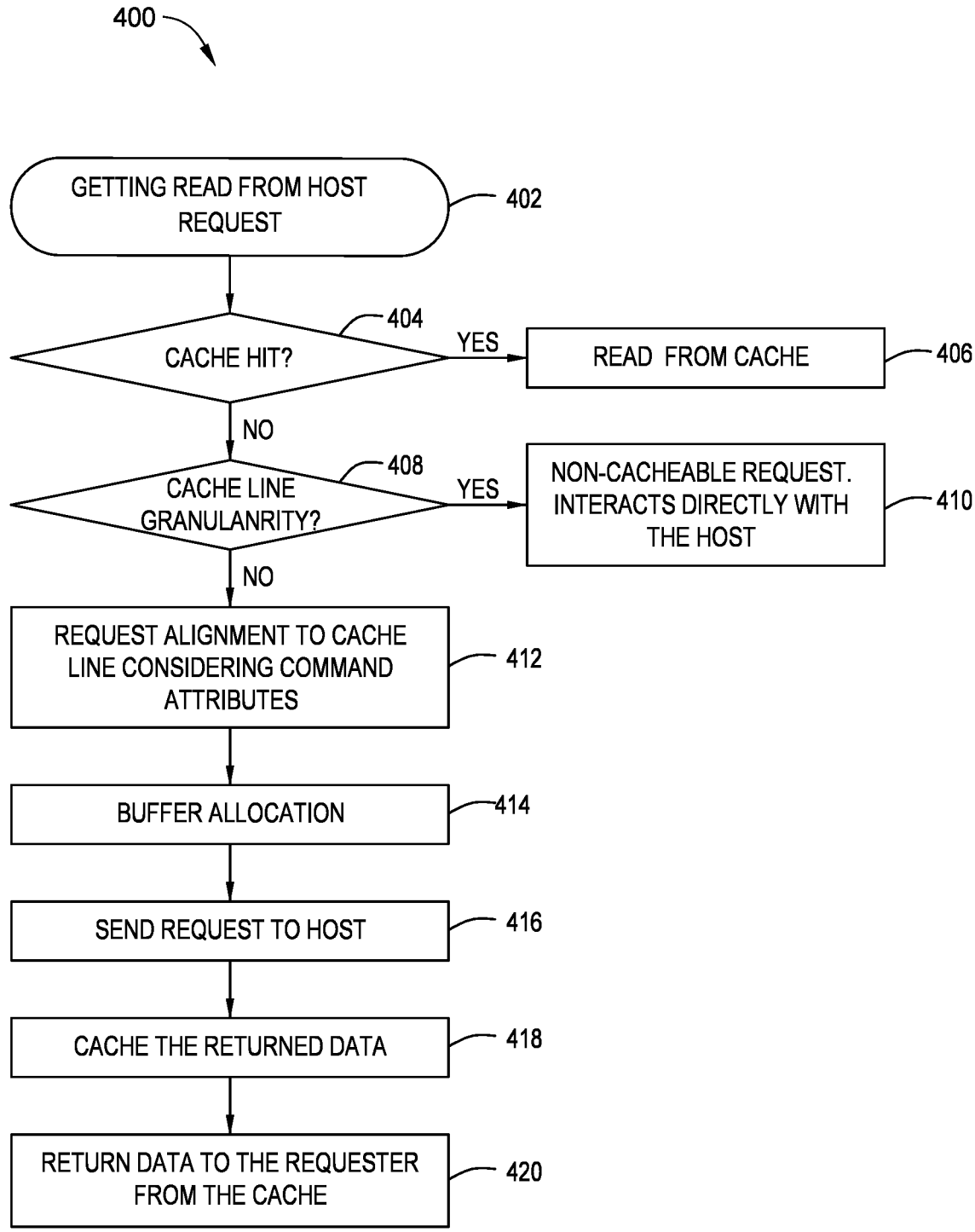
FIG. 4 is a flowchart illustrating a method of write command processing, according to one embodiment.

FIG. 4 is a flowchart illustrating a method 400 of write command processing, according to one embodiment. Aspects of the storage system 300 of FIG. 3 may be similar to the embodiments described herein. At block 402, the device controller, such as the device controller 304 of FIG. 3, receives an internal host, such as the host device 302 of FIG. 3, read request (i.e., data storage device write command). The maximum size of the read request is equal to the value of the maximum read request size (MRRS) PCIe parameter. At block 404, the controller determines if the read from host request is a cache hit. A cache hit refers to data stored in the cache, such as the cache buffers 324 of FIG. 3, from a previous read request. If there is a cache hit at block 404, then at block 406, the data is read from the cache.

However, if there is not a cache hit at block 404, then at block 408, the controller determines if the read from host request is of a cache line granularity. The cache line granularity refers to whether the read is aligned with the MPS or not aligned with the MPS. If the read is of a cache line granularity at block 408, then at block 410, the read is determined to be a non-cacheable request and the data associated with the read request is directly transferred to the host device while bypassing the cache.

If the read from host request is not of a cache line granularity at block 408, then at block 412, the controller requests an alignment to the cache line while considering the attributes of the write command. The request address and size are first aligned to the MPS by extending the request while maintaining the write command boundary. At block 414, a cache buffer is allocated. At block 416, the aligned request is transferred to the host device. At block 418, the returned data is stored in the cache buffer while transferring the relevant data to the host device at block 420. The remaining data stored in the cache buffer may be transferred later when the device controller receives a request for reading another part of the cache line. When receiving a request for reading another part of the cache line, the controller determines a cache hit at block 404 and the relevant data will be read from the cache buffer.

Figure 5:
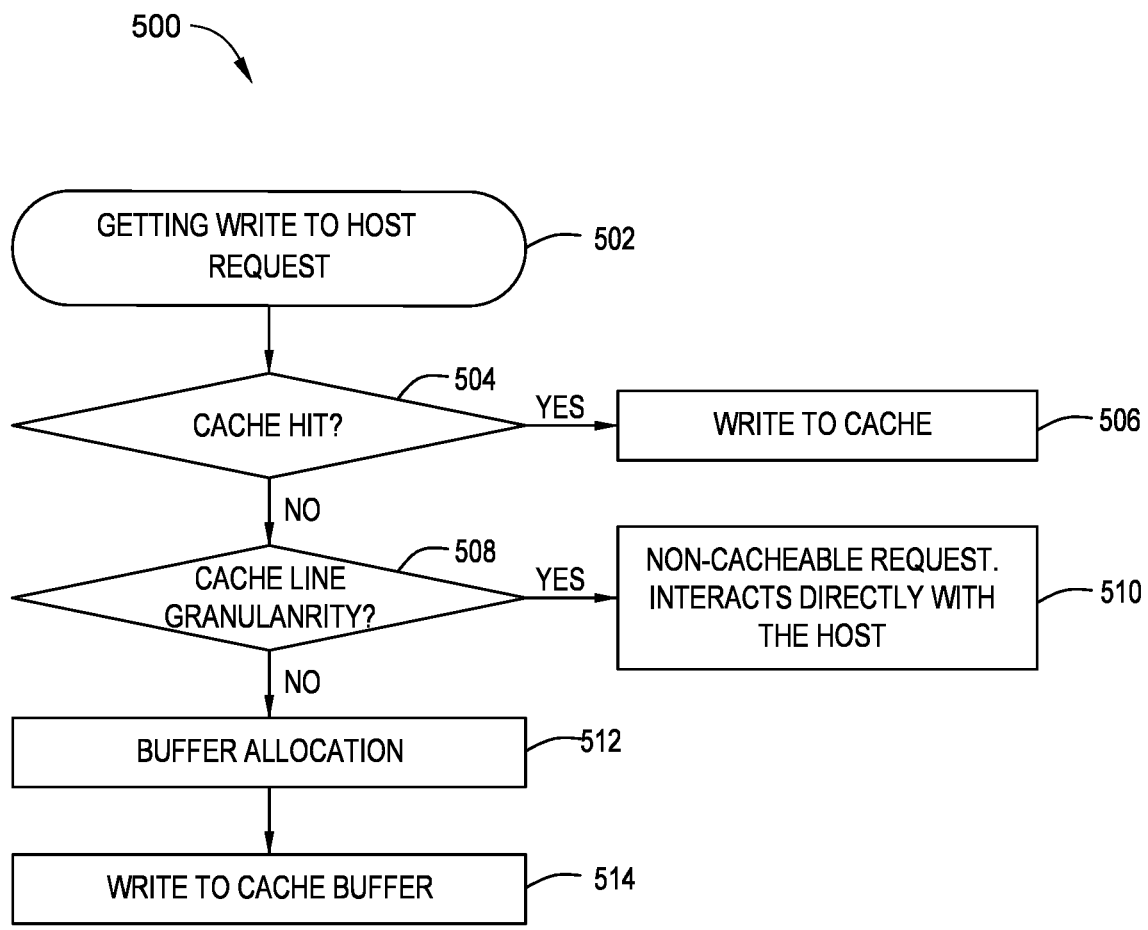
FIG. 5 is a flowchart illustrating a method of read command processing, according to one embodiment.

FIG. 5 is a flowchart illustrating a method 500 read command processing, according to one embodiment. Aspects of the storage system 300 of FIG. 3 may be similar to the embodiments described herein. At block 502, the device controller, such as the device controller 304 of FIG. 3, receives an internal host, such as the host device 302 of FIG. 3, write request (i.e., data storage device read command). The maximum size of the write request is equal to the value of the MPS PCIe parameter. At block 504, the controller determines if there is a cache hit, where a cache hit refers to determining if data related to the write request is stored in a cache buffer, such as the cache buffers 324 of FIG. 3.

If there is a cache hit at block 504, then at block 506, the data is written to the cache, where writing data to the cache refers to reading the relevant data from the cache to the host device. However, if there is not a cache hit at block 504, then at block 508, the controller determines if the write request is of a cache line granularity. If the write request is of a cache line granularity at block 508, then the controller determines that the write request is a non-cacheable request and the write request interacts directly with the host at block 510. However, if the write request is not of a cache line granularity at block 508, then a cache buffer is allocated at block 512. When a write request is not of a cache line granularity, then the host request is considered to be unaligned. At block 514, the data of the write request is written to the cache buffer. When the cache buffer is fully populated or the read command is completed, the data of the cache buffer is flushed to the host device.

FIGS. 6A and 6B are flowcharts illustrating methods 600, 650 of cache flushing, according to multiple embodiments. The method 600 of cache flushing begins at block 602, where the controller receives a request to post a completion entry to the host device, such as when the write commands of FIG. 4 or read commands of FIG. 5 are completed. At block 604, the device controller flushes the relevant cache buffers with the completed command and releases the cache buffers, at block 606, to a pool of cache buffers available to be allocated to store cached data. At block 608, the device controller posts a completion entry to the host device. At block 610, the device controller asserts an interrupt to the host when enabled.

The method 650 of cache flushing may be an optional method of cache flushing. Rather than flushing all cache buffers associated with the command at block 604, at block 652, the data storage device has fully accessed a specific cache buffer. At block 654, the device controller flushes the cache entry buffers associated with the specific cache line. At block 656, the cache buffer is released. Unlike the method 600, where the entire cache buffer is flushed and released, the method 650 may alternatively flush and release specific cache buffers. After completing the step at block 656, the method 650 may return to the method 600 at block 608.

By utilizing cache buffer storage for unaligned host requests, only optimized packets are delivered over the PCIe bus which increases the overall performance of the data storage device.

In one embodiment, a data storage device comprises: one or more memory devices; and a controller coupled to the one or more memory devices, wherein the controller is configured to: receive a read from host request; determine that the read from host request exceeds a maximum payload size (MPS); align an address and size of the request to the MPS to create an aligned request; allocate cache buffer storage space for the read from host request; send the aligned request to a host device; receive returned data that exceeds the MPS for the aligned request; and store the returned data in the allocated cache. The controller is further configured to deliver the returned data to the one or more memory devices from the allocated cache storage space. The controller is further configured to request the returned data from the allocated cache buffer storage space. The returned data is delivered to the one or more memory devices in response to the request. The controller is further configured to determine whether the read from host request is a cache hit. The controller is further configured to read data from the allocated cache when the read from host request is a cache hit. The controller is further configured to determine whether the read from host request is a cache line granularity. The controller is further configured to process the read from host request without using the cache buffer storage when a determination is made that the read from host request is a cache line granularity.

In another embodiment, a data storage device comprises: one or more memory devices; an interface module; and a controller coupled to the one or more memory devices, wherein the controller is configured to: receive a host request through the interface module; determine that the host request is unaligned; and retrieve data from cache. The host request is a write to host request. The controller is further configured to determine whether the host request is a cache hit. The controller is further configured to write data to the cache in response to determining that the host request is a cache hit. The controller is further configured to determine whether there is a cache line granularity in the host request. The controller is further configured to interact directly with the host upon determining that there is a cache line granularity. The controller is further configured to allocate cache buffer storage and write data to the allocated cache buffer storage. The controller further comprises a random access memory (RAM) controller coupled to the interface module. The data storage device further comprises a RAM device coupled to the RAM controller, wherein the cache is in the RAM device.

In another embodiment, a data storage device comprises: one or more memory device; interface means for determining unaligned access requests from a host device; and a controller coupled to the one or more memory devices. The data storage device further comprises: means to receive a request to post a completion entry to the host device; and means to flush all cache buffers associated with a command and post a completion entry to the host device. The data storage device further comprises: means to release relevant cache buffers; and means to post a completion entry to the host device.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
one or more memory devices; and
a controller coupled to the one or more memory devices, wherein the controller is configured to:
receive a read from host request;
determine that the read from host request exceeds a maximum payload size (MPS);
align an address and size of the request to the MPS to create an aligned request;

allocate cache buffer storage space for the read from host request;

send the aligned request to a host device;

receive returned data associated with the aligned request from the host device, wherein the returned data exceeds the MPS, and wherein the returned data is contiguous; and store the returned data in the allocated cache buffer storage space.

2. The data storage device of claim 1, wherein the controller is further configured to deliver the returned data to the one or more memory devices from the allocated cache storage space.

3. The data storage device of claim 2, wherein the controller is further configured to request the returned data from the allocated cache buffer storage space.

4. The data storage device of claim 3, wherein the returned data is delivered to the one or more memory devices in response to the request.

5. The data storage device of claim 1, wherein the controller is further configured to determine whether the read from host request is a cache hit.

6. The data storage device of claim 5, wherein the controller is further configured to read data from the allocated cache when the read from host request is a cache hit.

7. The data storage device of claim 1, wherein the controller is further configured to determine whether the read from host request is a cache line granularity.

8. The data storage device of claim 7, wherein the controller is further configured to process the read from host request without using the cache buffer storage when a determination is made that the read from host request is a cache line granularity.

9. A data storage device, comprising:
one or more memory devices;
an interface module; and
a controller coupled to the one or more memory devices, wherein the controller is configured to:
receive a host request through the interface module;
determine that the host request is unaligned, wherein the host request is greater than a maximum payload size (MPS); and
retrieve data from cache, wherein the data stored in the cache is associated with a previous unaligned host request that is greater than the MPS, and wherein the data associated with the previous unaligned host request is contiguous.

10. The data storage device of claim 9, wherein the host request is a write to host request.

11. The data storage device of claim 9, wherein the controller is further configured to determine whether the host request is a cache hit.

12. The data storage device of claim 11, wherein the controller is further configured to write data to the cache in response to determining that the host request is a cache hit.

13. The data storage device of claim 9, wherein the controller is further configured to determine whether there is a cache line granularity in the host request.

14. The data storage device of claim 13, wherein the controller is further configured to interact directly with the host upon determining that there is a cache line granularity.

15. The data storage device of claim 9, wherein the controller is further configured to allocate cache buffer storage and write data to the allocated cache buffer storage.

16. The data storage device of claim 9, wherein the controller further comprises a random access memory (RAM) controller coupled to the interface module.

17. The data storage device of claim 16, further comprising a RAM device coupled to the RAM controller, wherein the cache is in the RAM device.

18. A data storage device, comprising:
one or more memory means; and
a controller coupled to the one or more memory means, wherein the controller is configured to:
determine that a request from a host device is an unaligned access request, wherein the unaligned access request is greater than a maximum payload size (MPS);
request data associated with the unaligned access request, wherein an address and a size of the requested data is aligned to the MPS;
receive the requested data from either the host device or the one or more memory means, wherein the received requested data is greater than the MPS, and wherein the received requested data is contiguous; and
store the received requested data in an allocated cache buffer for data greater than the MPS.

19. The data storage device of claim 18, wherein the controller is further configured to:
receive a request to post a completion entry to the host device; and
flush all cache buffers associated with a command and post a completion entry to the host device.

20. The data storage device of claim 18, wherein the controller is further configured to:
release relevant cache buffers; and
post a completion entry to the host device.

* * * * *